Oct. 23, 1951 — C. A. BATEMAN — 2,572,099
GRAIN TRAILER

Filed Sept. 27, 1949 — 3 Sheets-Sheet 1

C. A. Bateman
INVENTOR

BY *CA Snow & Co.*
ATTORNEYS.

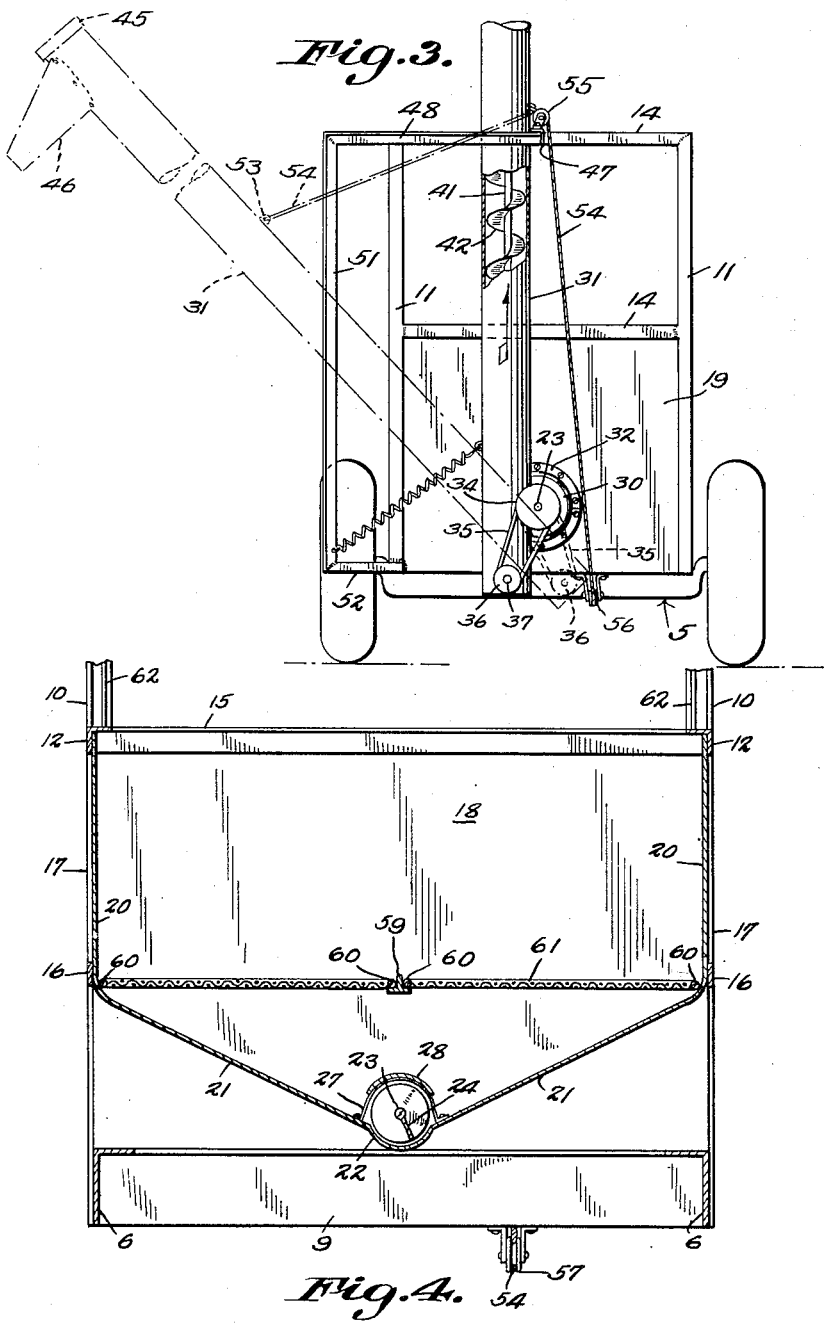

Oct. 23, 1951  C. A. BATEMAN  2,572,099
GRAIN TRAILER

Filed Sept. 27, 1949  3 Sheets-Sheet 3

C. A. Bateman
INVENTOR

BY Charnow & Co.
ATTORNEYS.

Patented Oct. 23, 1951

2,572,099

UNITED STATES PATENT OFFICE 2,572,099

GRAIN TRAILER

Calvin A. Bateman, Etna, Wyo.

Application September 27, 1949, Serial No. 118,077

2 Claims. (Cl. 214—83.16)

This invention relates to a trailer adapted for moving grain from one location to another and for permitting the unloading of said grain with speed and ease despite varying unloading conditions.

At this point, it is to be understood that although the title, and specification set forth the invention as comprising a grain trailer, this is simply by way of illustration, a grain trailer being one of the readiest applications of the principles of the invention. It will become clearly apparent from the drawing, description, and claims that the structure is one which can be adapted for many other purposes, such as for providing a trailer used to transport and unload chopped hay, corn on the cob, shelled corn, coal (either nut size or slack) and other similar substances. In some cases the dimensions of parts would accordingly be changed to accommodate material having special characteristics. Additionally, the principle of the invention is also adapted to trucks as well as trailers, said trucks being in this case equipped with a special box or bed formed as described and claimed herein, and the principle is also applicable to cribs, or box-beds on skids.

By way of background, it may be noted that a problem has heretofore existed in respect to the transportation of grain, for example, from the combine in the field to a storage bin, elevator, or other location. The use of conventionally constructed trucks, trailers, or the like has not represented a solution to this problem, since oftentimes, when the truck or trailer arrives at the location at which the grain is to be unloaded, still other machinery must be brought into play for the purpose of removing the grain therefrom and elevating it, for storage.

It is an important object of the present invention to obviate these difficulties through the provision of a trailer particularly designed for transporting and unloading grain.

Another important object is to provide a trailer of the type stated which can be attached to a conventional tractor in the field, so as to permit loading of the grain directly from a combine to said trailer, and which trailer when drawn to the location at which the grain is to be unloaded, includes novelly arranged means for conveying the grain from the box or hopper of the trailer, to the bin, truck, railway car or the like.

Summarized briefly, the invention comprises a wheel supported chassis adapted for connection to a tractor or similar vehicle; a box-frame mounted on said chassis; a box or hopper carried by the box-frame; a feed screw or auger mounted in the bottom of the box and extending longitudinally thereof; an elevator tube mounted for swinging movement on the back of the box and having communication with the bottom of the box to receive grain conveyed by said auger; an auger mounted in said elevator tube so as to convey the grain upwardly within the tube; means for adjusting the elevator tube as desired to deliver the grain where necessary; and an operative driving connection extending from the take-off of the tractor to and including both the augers for driving the same in any relative position of the elevator tube and box.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 3 is a rear elevational view, the dotted lines indicating a different position of the elevator tube.

Fig. 4 is an enlarged section on line 4—4 of Fig. 1.

Figure 2:
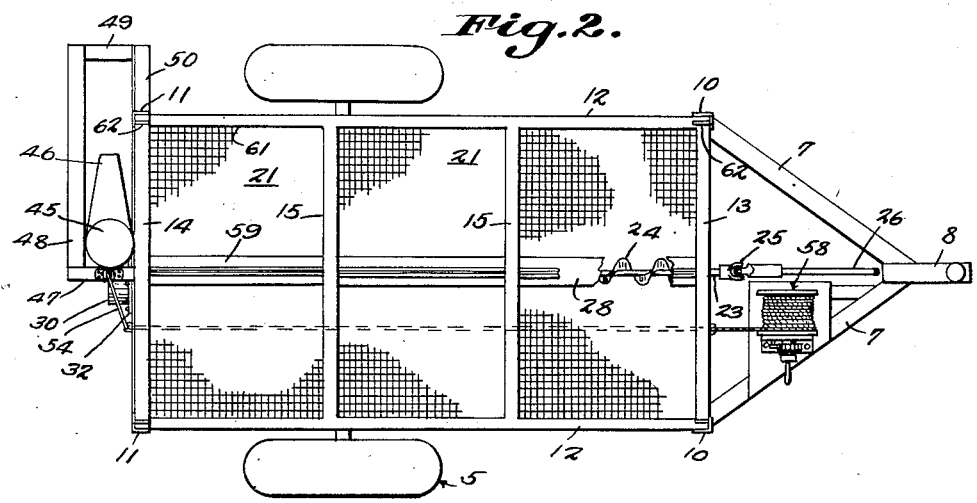
Fig. 2 is a top plan view, portions being broken away.

Referring to the drawings in detail, in the illustrated example of the invention, which is merely a presently preferred embodiment thereof, I provide the dropped axle and wheel assembly generally designated 5, supporting the spaced parallel longitudinally extending frame members 6 of angle iron material, the front portions 7 of which converge as best shown in Fig. 2 and are rigidly secured to each other and to a ball and socket trailer hitch 8 whereby the trailer can be attached to a conventional tractor or similar traction vehicle, not shown.

At spaced intervals longitudinally thereof, the members 6 are rigidly joined by cross members 9 to complete the formation of the wheel supported chassis, that is of a size and strength sufficient to support all other portions of the grain trailer, including the loaded hopper.

Figure 1:
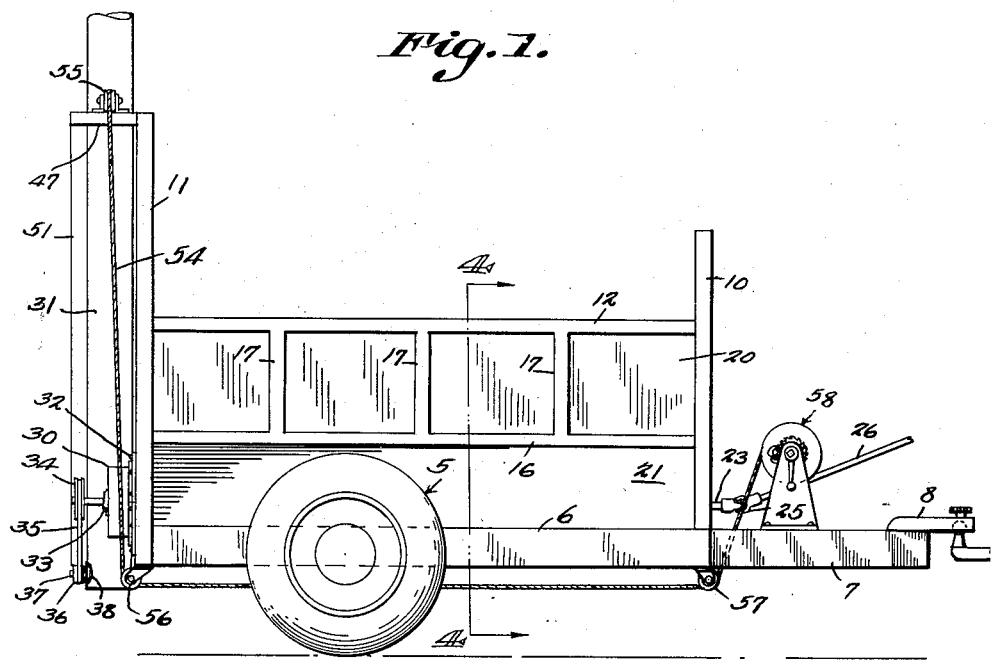
Fig. 1 is a side elevational view of a grain trailer constructed in accordance with the invention, portions being broken away.

Mounted on said wheel supported chassis is a hopper or box frame which at its front end is provided with corner front uprights 10 of angle iron material, and which at its rear end is provided with corner uprights 11 that extend a substantial distance higher than the uprights 10, as may be readily noted from Fig. 1, the uprights 10 themselves extending higher than the top of the box as normally constituted. Extending between the front and rear uprights are the upper longitudinal members 12 the ends of which are rigidly secured in any suitable manner, as by welding or the like, to the uprights 10 and 11 respectively. Also rigidly secured to said uprights 10 and rigidly connecting the uprights 10, is the front cross brace 13. Rigidly secured at its ends to the rear uprights 11 is the rear cross brace 14. Medial cross braces 15 in any suitable number extend between and are rigidly connected at their ends to, the medial portions of the side members 12.

Parallel to and spaced below the side members 12 are the lower longitudinal frame members 16, that are rigidly connected at their ends to the front and rear uprights 10 and 11, and a plurality of vertical braces 17 rigidly connect said members 12 and 16, as may be readily noted from Fig. 1.

Thus, it will be seen that mounted rigidly upon the wheel supported chassis previously described, is a box-like rectangular external frame or skeleton for supporting the box or hopper which will now be described.

The box includes a rectangular front wall 18 extending between the front uprights 10, and a rectangular rear wall 19 extending between the rear uprights 11, these vertical front and rear walls defining the front and back, respectively, of the hopper. These walls, as well as the side walls to be described, are preferably of rolled steel plate or the like, and are rigidly secured as by welding or riveting, to the corner uprights and box frame. A single large sheet of steel may be used to provide the side and bottom walls of the box. In this connection, as may be noted from Fig. 4, the box is provided with vertical side walls 20 extending downwardly from the upper side members 12 and supported and rigidly secured in any suitable manner both to said members 12 and to the lower side members 16. At the location where the side walls 20 are rigidly secured to the lower side members 16, they are turned inwardly to provide a tapered bottom 21 on the box, having downwardly converging side portions that are spaced apart at the lowermost portion of the box by an auger trough 22 that extends from front to rear of the box, and to which all grain deposited in the box will gravitate as may be readily seen from Fig. 4.

This completes the formation of the box, and there will now be described the means which I have provided for conveying grain which has been transported in the box, out of the box and to the location at which it is to be deposited on removal from the box.

To this end, I provide an auger shaft 23 rigid with the helical feed or auger 24 that rotates within the auger trough 22 for the purpose of conveying grain gravitating to said trough from front to rear of the box. The front end of the shaft 23 is journaled in a suitable bearing mounted in the lower portion of the front wall 18 of the box, and projects beyond said front wall as readily seen from Figs. 1 and 2, where said shaft 23 is connected by a universal joint 25 which may also include a spline or slip joint, operatively connecting said shaft 23 to a drive shaft 26 leading from the power take-off, not shown, of a conventional tractor or similar vehicle, also not shown.

Referring to Fig. 4, an arcuate flange 27 is bolted to the bottom of the box, and extends over the front portion of the auger 24, to support one end of a shield or hood 28 extending from front to rear of the box, and supported at its rear end by the inturned flange 29 formed on the rear wall 19, the rear wall 19 being provided with a large opening immediately below the flange 29 through which opening grain conveyed by the auger 24 is fed in unloading the box.

Grain conveyed through said opening in the rear end of the box is moved (see Fig. 5) into a cup-like housing 30 mounted exteriorly of the rear wall 19 for rotatable movement, said cup-like housing 30 being rigid with and being in full communication with the lower portion of an elevator tube 31 mounted upon and exteriorly of the rear wall 19 in a manner to be described in greater detail hereafter, and extending upwardly a substantial distance above the upper end of the box.

As a suitable rotatable mounting for the cup-like housing 30 communicating between the box and elevator tube 31, I provide the peripheral flange on said housing 30, engaged under an annular flange 32 that is bolted in any suitable manner to the exterior surface of the rear wall 19.

Figure 5:
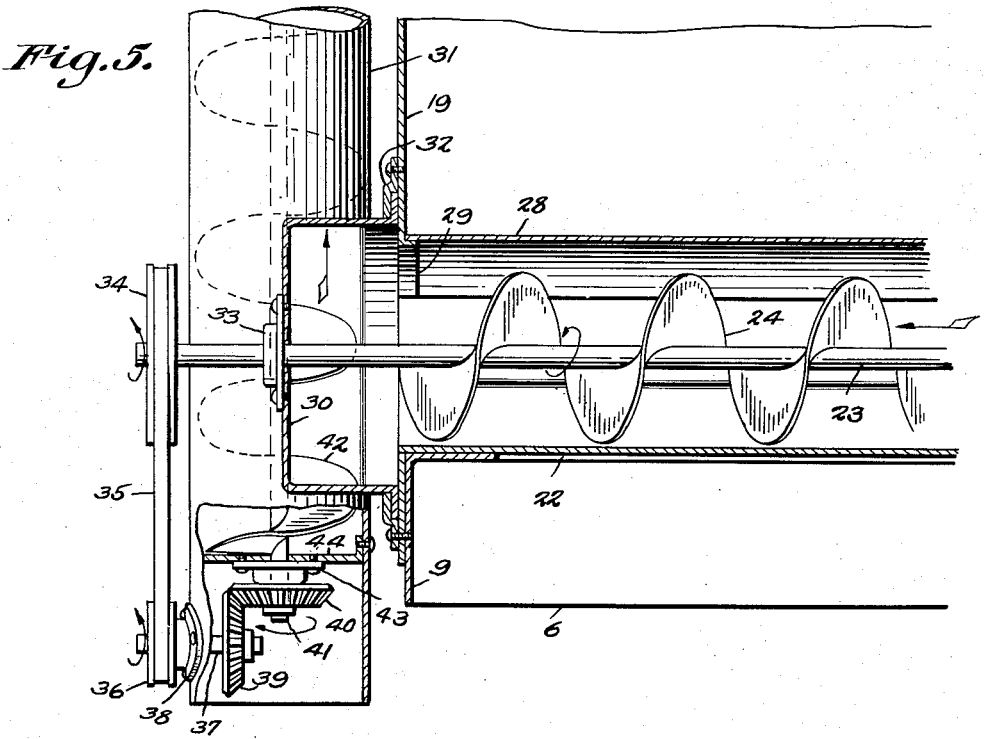
Fig. 5 is a section, still further enlarged, taken longitudinally through the rear lower portion of the box showing the communicating arrangement between the box or hopper and elevator tube and the driving connection between the augers.
Figure 6:
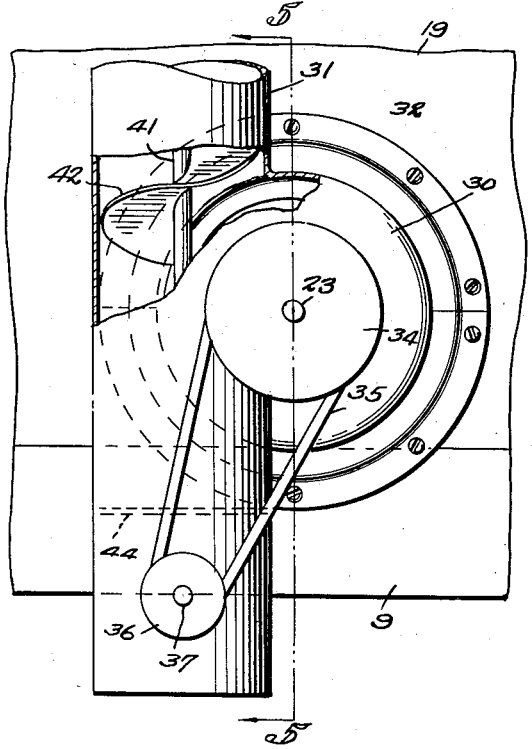
Fig. 6 is a fragmentary enlarged rear elevational view of said tube and hopper connection, portions being broken away.

The shaft 23, as seen from Fig. 5, extends through the housing 30, and projects beyond said housing, said shaft 23 being journaled in a suitable bearing 33 secured to the housing, and having on its projecting end the pulley 34 around which passes the belt 35 that also passes around the smaller pulley 36 secured to and rotating the stub shaft 37 journaled in bearing 38 mounted upon the lower end of elevator tube 31, the inner end of the stub shaft 37 having secured thereto the beveled gear 39 in mesh with gear 40 secured to and rotating auger shaft 41 carrying the feed screw or auger 42 that extends the length of the elevator tube 31, said lower end of the auger shaft 41 being journaled in bearing 43 secured to the underside of a closure plate 44 closing the lower end of the elevator tube 31.

The upper end of the elevator tube 31 is provided with a cap 45, so that all grain conveyed upwardly in the tube by means of the auger 42 is caused to be discharged through a lateral spout 46 extending from the upper end of the elevator tube.

As previously noted, the housing 30 is mounted for rotation on the rear end of the box, and this is for the purpose of permitting swingable movement of the elevator tube 31 to selected positions of adjustment, as may be noted from Fig. 3 wherein a position of adjustment is illustrated by way of example in dotted lines.

To guide the tube 31 in its swingable movement, I provide an elevator tube frame mounted on and rigidly secured to the uprights 11, and to this end, short frame members 47 can extend rearwardly from the cross brace 14, said frame members 47 having rigidly secured thereto the frame members 48 spaced from the cross brace 14 and parallel thereto, to define a space in which the elevator tube is guided when being swingably adjusted. Secured to the member 48 (Fig. 3) and downwardly extending from said member 48 is the upright 51 secured at its lower end to member 52 that in turn is secured to the rear end of the box frame in spaced relation to said box frame. The members 48, 51, and 52 constitute an outer guide frame mounted in a vertical plane. The members 11, and 14, constitute an inner guide frame also mounted in a vertical plane, these guide frames being disposed at opposite sides of the elevator tube and guiding the tube throughout its path of swingable adjustment. The connecting members 47 and 49 at the upper and lower ends of the guide frames connect said frames and constitute stops limiting movement of the elevator tube in opposite directions. As may be noted from Fig. 3, a spring extends between the elevator tube and one of the guide frames, the other guide frame in the illustrated example, yieldably tending to urge the elevator tube in one direction. Cable means are provided, in a manner to be described hereinafter, whereby the elevator tube can be adjusted in an opposite direction against the action of the spring. The inner guide frame, as may be noted, is of inverted U-shape, while the outer guide frame is of inverted L-shape and is offset laterally of the inner guide frame as readily seen from Fig. 3.

For the purpose of permitting adjustment by an operator of the elevator tube 31, to a selected position of swingable adjustment, I connect to a medial portion of the elevator tube, as at 53, one end of a cable 54 that is trained over a sheave 55 mounted upon the upper end of the elevator tube frame, said cable 54 then passing downwardly and under a sheave 56 mounted on the rear lower portion of the chassis. Thereafter, the cable is extended forwardly under the trailer as may be readily seen from Fig. 1, being trained over a sheave 57 at the front end of the trailer and extending to and being wound upon a winch 58 which in the present instance is hand-operated, although the winch can be motor-operated if desired.

I prefer to provide a screen that covers the tapered bottom of the box, so as to protect the auger mechanism from any large objects which may accidentally fall into the box. Additionally, the screen is a safety device in the event a helper assisting in the loading of the box might accidentally fall thereinto while the auger is in operation. In the present instance, I provide a screen support in the form of a T-iron 59 extending longitudinally and centrally of the lower portion of the box (see Fig. 4) and rigidly secured at its front and rear ends to the front and rear walls of the box. This supports heavy wire screen frame 60 carrying the screen mesh material 61.

Additionally, I desire to provide the trailer with a means whereby greater amounts of grain can be loaded into the box than is the normal capacity of the box. To this end, vertical bars 62 are welded or otherwise rigidly secured to the respective corner uprights 10 and 11, and are spaced from said uprights a sufficient distance to receive side boards, not shown, for extending the box upwardly thus to permit the box to hold a greater supply of grain than would be the normal capacity thereof.

I believe the advantages of a grain trailer constructed in accordance with the invention may be readily noted from the foregoing description. As may be readily seen, the trailer can be drawn directly into a field, and grain can be loaded directly from a combine into said trailer. Additionally, the trailer is of course adapted to be loaded from an elevator, railway car, or from any other suitable location.

In any event, assuming that the trailer has been loaded, it is used to transport the grain to the place of unloading. If the location in which the grain is to be unloaded is higher than the trailer, which is often the case, the elevator tube is simply swingably adjusted to position the spout 46 thereof directly over the place in which the grain is to be unloaded. Then, by means of the power take-off on the tractor, the augers 24 and 42, linked for joint operation, are placed into operation, and these augers of course are driven from the power take-off regardless of the relative position of the elevator tube and box. In any event, the grain gravitating into the trough 22 is conveyed rearwardly through the opening in the rear wall 19, and thence moves into the housing 30, communicating between the bottom of the box and the bottom of the elevator tube 31. The grain is thereafter deposited in the lower end of the elevator tube 31, and is conveyed upwardly in said tube by the auger 42, the grain being discharged at the upper end of the elevator tube 31, through the discharge spout 46.

What is claimed is:

1. A grain trailer comprising a grain-receiving box, an auger mounted in said box and adapted to convey grain out of one end of the box, an elevator tube mounted upon and exteriorly of said end of the box and adapted to receive grain so conveyed, an auger in the elevator tube for conveying grain through said tube, an operative driving connection between both augers adapted to drive the augers jointly in any relative position of the elevator tube and box, and means for swingably adjusting the elevator tube in a vertical plane to selected positions of adjustment, said means comprising inner and outer guide frames mounted rigidly upon said end of the box in spaced vertical planes at opposite sides of the elevator tube, said guide frames being proportioned to engage and guide the elevator tube throughout its path of swingable adjustment, connecting members extending between said guide frames at the upper and lower ends thereof and positioned across said path to limit adjustment of the elevator tube in opposite directions, a spring connected to said tube and to one of the guide frames and tending to swing the tube in one direction, a cable connected to the tube at one end, and a winch mounted upon said box and on which the other end of the cable is wound, for swinging the tube in an opposite direction against the action of the spring.

2. A grain trailer as in claim 1, and wherein said inner and outer guide frames are of inverted U-shape and inverted L-shape respectively, the outer guide frame being offset from the inner guide frame laterally of said box.

CALVIN A. BATEMAN.

REFERENCES CITED

The following references are of record in the file of this patent:

UNITED STATES PATENTS

| Number | Name | Date |
|---|---|---|
| 765,085 | Lanpher | July 12, 1904 |
| 1,165,736 | White | Dec. 28, 1915 |
| 2,275,799 | Oklejas | Mar. 10, 1942 |
| 2,439,541 | Hall | Apr. 13, 1948 |
| 2,445,886 | Mulligan | July 27, 1948 |
| 2,470,836 | Piper | May 24, 1949 |
| 2,481,860 | Miller | Sept. 13, 1949 |
| 2,514,785 | Nechville et al. | July 11, 1950 |